United States Patent
Kowalski

(10) Patent No.: US 8,380,645 B2
(45) Date of Patent: Feb. 19, 2013

(54) METHOD AND SYSTEM TO ENABLE INFERENCING FOR NATURAL LANGUAGE QUERIES OF CONFIGURATION MANAGEMENT DATABASES

(75) Inventor: Vincent Kowalski, Houston, TX (US)

(73) Assignee: BMC Software, Inc., Houston, TX (US)

(*) Notice: Subject to any disclaimer, the term of this patent is extended or adjusted under 35 U.S.C. 154(b) by 447 days.

(21) Appl. No.: 12/788,476

(22) Filed: May 27, 2010

(65) Prior Publication Data

US 2011/0295788 A1 Dec. 1, 2011

(51) Int. Cl.
*G06F 15/18* (2006.01)
(52) U.S. Cl. .......................................... 706/12
(58) Field of Classification Search ............ 706/12, 706/45, 62
See application file for complete search history.

(56) References Cited

U.S. PATENT DOCUMENTS

2005/0267871 A1* 12/2005 Marchisio et al. ............... 707/3
2011/0295789 A1* 12/2011 Shacham et al. ............... 706/52

* cited by examiner

*Primary Examiner* — David Vincent

(57) ABSTRACT

Disclosed are embodiments of systems and methods to derive a semantic network from a CMDB relationship graph which can then be queried in a natural way from a linguistic standpoint (i.e., using natural language queries). Because disclosed embodiments combine natural language queries with an inferencing engine the disclosed systems and methods automatically "connect the dots" between disparate pieces of information and can allow for a richer user experience. In general, CMDB graph relationships can be converted into semantic networks. Once a semantic network is created, queries can be phrased to leverage the inferential relationships between objects in the semantic network.

24 Claims, 11 Drawing Sheets

METHOD AND SYSTEM TO ENABLE INFERENCING FOR NATURAL LANGUAGE QUERIES OF CONFIGURATION MANAGEMENT DATABASES

BACKGROUND

This disclosure relates generally to the field of Configuration Management Database (CMDB) query technology. More particularly, but not by way of limitation, this disclosure refers to a method and system providing a combination of Natural Language (NL) query capability with application of inferential query techniques to access data from a CMDB.

A CMDB is a repository of information related to as many of the components of an information system as practical. Although repositories similar to CMDBs have been used by Information Technology (IT) departments for many years, the term CMDB has more recently been formalized with the Infrastructure Technology Infrastructure Library (ITIL). ITIL is a set of concepts and practices for managing IT services, development, and operations. ITIL gives detailed descriptions of a number of important IT practices and provides comprehensive checklists, tasks, and procedures that any IT organization can tailor to its needs. ITIL is published in a series of books, each of which covers an IT management topic. The names ITIL and IT Infrastructure Library are registered trademarks of the United Kingdom's Office of Government Commerce (OGC). Note CMDB references are used throughout this disclosure, however, the term Configuration Management System (CMS) is a term introduced in newer releases of ITIL. Accordingly, aspects of this disclosure will clearly be applicable to at least a portion of a CMS.

In the ITIL context, a CMDB represents the authorized configuration of the significant components of an IT environment. A CMDB helps an organization understand relationships between these components and track their configuration. The CMDB can be a fundamental component of the ITIL framework's Configuration Management (CM) process. CMDB implementations often involve federation (the inclusion of data into the CMDB from other sources) of multiple repositories (e.g., Asset Management databases, HR systems, Incident and Problem systems, Change Management systems, discovery tools, inventory and audit systems, etc) in such a way that the source of the data retains control of the data. Federation is usually distinguished from ETL (extract, transform, load) solutions in which data is copied into the CMDB.

The CMDB records configuration items (CI) and details about the important attributes and relationships between CIs. Configuration managers usually describe CIs using three configurable attributes: Technical, Ownership, and Relationship.

Today graph based queries to a CMDB are focused on query graphs of relationships between and among CIs. Current CMDB graph query technologies do not utilize additional data that may be derived from explicitly stored relationship data in a CMDB. To overcome these and other limitations, it is desirable to provide an enhanced query capability for use in retrieving information from a CMDB, thereby, enhancing both the input mechanism defining the query and expand upon pertinent results returned to a user or application performing the query.

SUMMARY

Disclosed is a method and system for performing enhanced natural language queries of data relative to a Configuration Management Database (CMDB). Preferred embodiments include a use of inferential queries and iteration techniques that may allow a user query to be less constrained while returning a result that is more comprehensive and more accurately focused on the desired information. Iteration techniques include, but are not limited to, iterating over the relationship spanning tree emanating from a given CI and reporting other CIs implicitly related to the given CI. The implicitness of such relationships may be due to the distance from the given CI or due to apparent type mismatches of the relationships. To eliminate or reduce type mismatches, it may be desirable to normalize relationship types to a common set through active use of the natural language dictionary. To eliminate or reduce distance relationships, iterative techniques can be used to span many intermediate relationships (if necessary) to determine if two CIs are related. As a result of these techniques, the user can be less constrained when formatting their query because a natural language format can be used and because inferences can be automatically applied to the request and the data stored in the CMDB.

Disclosed embodiments can be implemented in standard or specialized computer systems. Also, instructions for performing disclosed methods may be tangibly embodied on computer-readable medium for storage and retrieval by computer systems.

DETAILED DESCRIPTION

Figure 1:
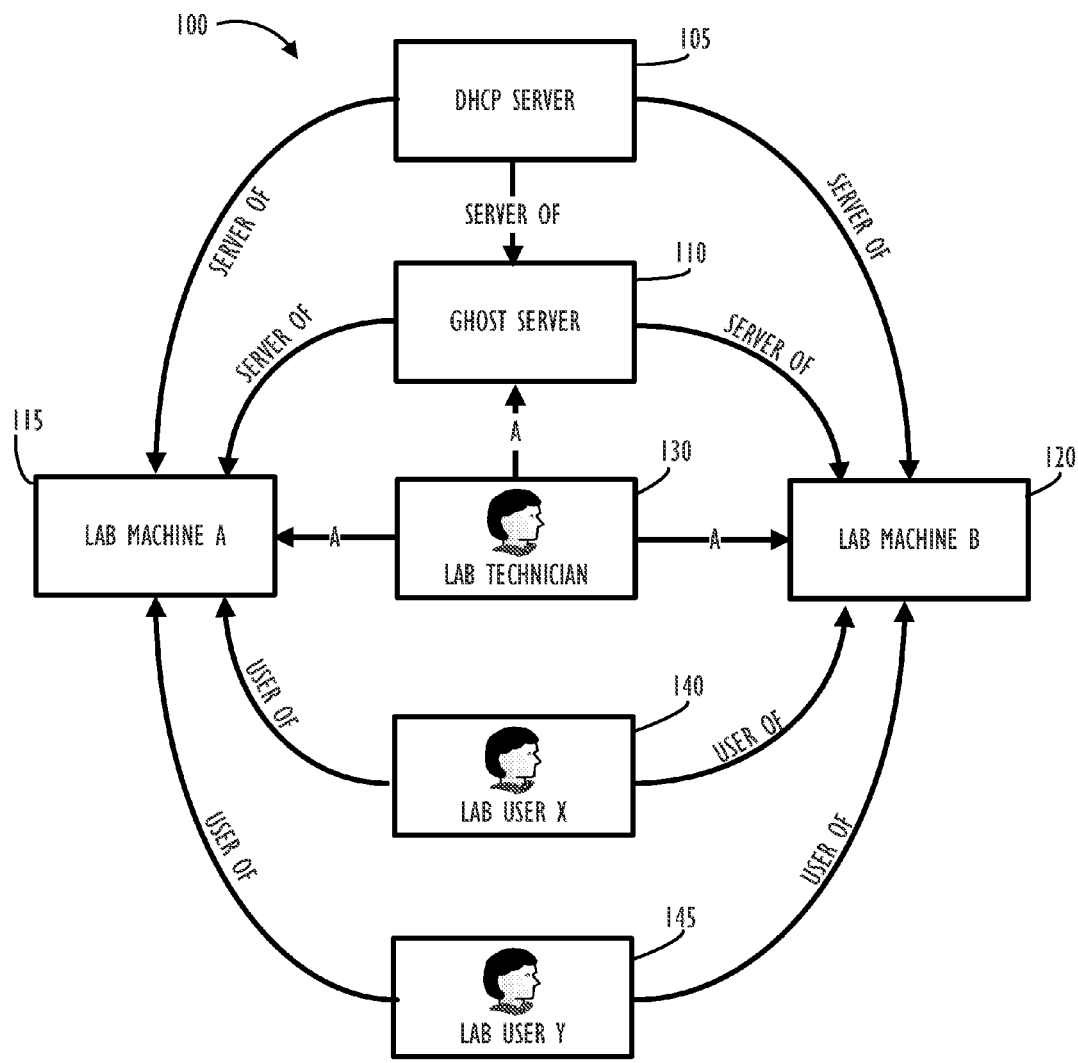
FIG. 1 shows, in block diagram form, an exemplary graph depiction of relationships between computer servers, system administrators and end users (i.e., an example semantic network).

Relationships in a CMDB typically record the association between Configuration Items (CIs). As first CIs may be related to second CIs which, in turn, may be related to other CIs and so on, this set of CIs and relationships between CIs form a web-like data structure that can be modeled as a graph. In computer science, a graph is an abstract data structure that is meant to implement the graph concept from mathematics. A graph data structure typically consists mainly of a finite (and possibly mutable) set of ordered pairs, called edges or arcs, of certain entities called nodes or vertices. As in mathematics, an edge (x,y) is said to point or go from x to y. The nodes may be part of the graph structure, or may be external entities represented by integer indices or references. A graph data structure may also associate to each edge some edge value, such as a symbolic label or a numeric attribute (cost, capacity, length, etc.). Although embodiments of this disclosure deal primarily with a CMDB, other data base types and styles may be used to support the disclosed embodiments.

A semantic network is a network which represents semantic relations among concepts. A semantic network representation is often used as a form of knowledge representation. Typically it is modeled as a directed or undirected graph consisting of vertices, which represent concepts, and edges which represent relationships.

An example of a semantic network is WordNet, a lexical database of English. It groups English words into sets of synonyms called synsets, provides short, general definitions, and records the various semantic relations between these synonym sets. Some of the most common semantic relations defined are meronymy (X is a meronym of Y if Xs are parts of Y(s)), holonymy (X is a holonym of Y if Y(s) are parts of X(s), holonymy is the opposite relationship to meronymy), hponymy (X is a hyponym to Y if X is subordinate to Y (e.g., X is a kind of Y)), synonymy (X denotes the same as Y) and antonymy (X denotes the opposite of Y).

Current CMDB graph query technologies typically only traverse CMDB relationship graphs and retrieve data based on specifications similar to the "select" and "where" clauses as used with a relational database. CMDB graph queries of the prior art basically have the ability to traverse graph structures that are determined by the relationships in the CMDB and give back some attribute information. Additionally, prior art CMDB graph queries are not able to make inferences that span multiple relationships—even where such inferences would be obvious to a human user and, perhaps more importantly, where such inferences would be difficult to ascertain by a human user. However, a person of ordinary skill in the art, given the benefit of this disclosure, will understand that the information to perform such inferences can be derived from information already stored and available in many CMDBs.

Disclosed embodiments include a use of inferential queries and iteration techniques that may allow a user query to be less constrained while returning a result that is more comprehensive and more accurately focused on the desired information. Iteration techniques include but are not limited to, iterating over the relationship spanning tree emanating from a given CI and reporting other CIs implicitly related to the given CI. The implicitness of such relationships may be due to the distance from the given CI or due to apparent type mismatches of the relationships. To eliminate or reduce type mismatches, it may be desirable to normalize relationship types to a common set through active use of the natural language dictionary. To eliminate or reduce distance relationships, iterative techniques can be used to span many intermediate relationships (if necessary) to determine if two CIs are related. As a result of these techniques, the user can be less constrained when formatting their query because a natural language format can be used and because inferences can be automatically applied to the request and the data stored in the CMDB.

FIG. 1 shows graph 100 as an example of a graph that could model a set of machines and users in quality assurance lab of an enterprise (i.e., it represents one possible semantic network). Graph 100 represents the set of available data as may be stored in a data base. Items include the elements shown in boxes and relationships are depicted by arrows. Server items are computers 105 and 110, End user computers (e.g. workstations) are computers 115 and 120, and users (sometimes called "contacts") are represented by boxes 130, 140 and 145, each box containing user symbol. Arrows indicate the provider as the starting point of the relationship and the dependent as the end point. DHCP server 105 has a "server of" relationship with each of computers 115, 110 and 120. Ghost Server 110 has a "server of" relationship with each of lab computers 115 and 120. Lab Technician 130 is the "administrator of" (indicated by Arrow with "A") each of machines 110, 115 and 120. Note Lab Technician 130 is not an administrator of DHCP server 105 because, in this example, DHCP server 105 may be a server of machines that are not lab machines. Finally, Lab User X (140) and Lab User Y (145) are "users of" each of Lab Machine A (115) and Lab Machine B (120). The direction of the arrows does not indicate navigability of graph 100; only which item is a provider and which is a consumer (e.g. dependent). Navigability of graph 100 is, for this example, bidirectional.

Each of the items shown in graph 100 could also be further classified beyond the three example classifications of server, workstation and user. However, for simplicity only three classifications are used in this example and relate directly to relationships "is server of," "administers," and "uses." Also, a real test lab environment would likely have many more relationships and items than are shown in graph 100.

Example queries which may be input to one embodiment of a "GetItemgraph" method against the basic data set of graph 100 include, but are not limited to: get all servers, get servers administered by Lab Technician 130, get anything used by Lab User X 140, get administrators for anything used by Lab User X 140, get users with any relationship to DHCP server 105, etc.

A natural language query is one that is expressed using normal conversational syntax; that is, you phrase your query as if making a spoken or written statement to another person. There are no syntax rules or conventions for you to learn. Natural language queries generally find more relevant information in less time than traditional Boolean queries, which, while precise, require strict interpretation that can often exclude information that is relevant to your interests. For the purposes of this disclosure, a "structured query" is a query conforming to syntax rules applicable to a database's input query requirements and can be generated from the natural language query.

An Inferencing engine typically works by applying a set of "rules"—statements such as, if (a and b) then infer c—to a set of atomic facts. The application of rules to derive new conclusions can occur either when a query is posed or when new facts are obtained. The set of rules and facts can be centralized (e.g., a CMDB) or distributed (e.g., a federated CMDB). Inferencing engines work on a "logical model" as opposed to a "physical model." The logical model is typically a set-theoretic abstraction. The logical model is by definition an abstract entity. Logical models are typically grounded in one or more concrete syntaxes (physical models). By analogy, in relational databases there is Relational Algebra which provides the logical model and syntaxes such as tab delimited tables which provide the physical model. The former is important for defining query languages such as SQL and the later is important for transferring content across a wire or storing data in physical storage. Any particular concrete manipulation is always performed on the physical model. For example, in Relational Databases the "order" of rows in a table carries no semantics. However, in a tab-delimited file the rows have to appear in some order. By operating at the relational level (as opposed to the file format level), SQL hides an aspect of the data that does not carry any semantics.

Some CMDB implementations provide graph queries and graph walk queries to traverse relationships between CIs stored in the CMDB. This mechanism often forces a user to translate the way they think about their environment into a graph query and then sift through the results set to find precise information about what they were looking for. It would therefore be desirable to have queries applied to the CMDB that are more closely aligned with the way people ask questions of their IT environment. By creating inferences from existing CMDB relationships, queries such as "are there any Apple G4 Computers in my enterprise?" and "is a PowerPC a component of an Apple G4" can be parsed and answered easily without producing irrelevant results to the user.

Disclosed are embodiments of systems and methods to derive a semantic network from a CMDB relationship graph which can then be queried in a natural way from a linguistic standpoint (i.e., using natural language queries). Disclosed capabilities go beyond current CMDB graph queries which require a user to phrase and perform a graph query that will result in a set of instances and relationships from which the user can then perform the inferencing themselves on the returned result set. Because disclosed embodiments combine natural language queries with an inferencing engine the disclosed systems and methods automatically "connect the dots" between disparate pieces of information and can allow for a richer user experience. In general, CMDB graph relationships can be converted into semantic networks. Once a semantic network is created, queries can be phrased to leverage the inferential relationships between objects in the semantic network.

In one particular representation model, graphs as applied to a CMDB can be thought of as having CIs as nodes or vertices and relationships forming the edges. A graph query can then be described as a query that traverses the graph in search of CI's whose properties match certain constraints. In some forms of graph query, CI relationships are traversed in a pair-wise fashion. In other forms of a graph query, the query is provided some starting node and is told to traverse some number of levels (i.e., depth) from that node in its search. Note a "maxPathLength" element can allow for a method to filter data when a particular relationship type is defined in the query. Further, a "maxPathLength" argument may not be supplied when the entire graph should be traversed to find all servers (i.e., no relationship defined in query).

Figure 2:
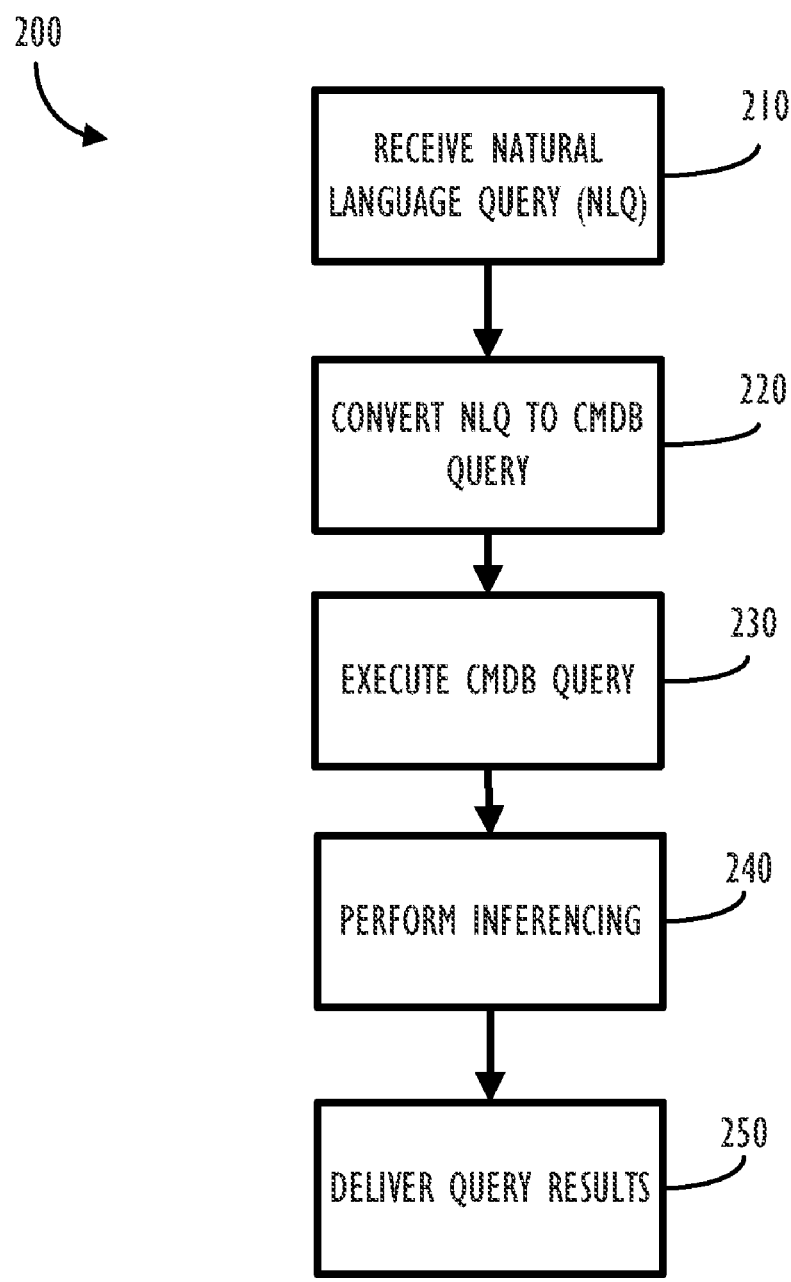
FIG. 2 shows, in flowchart form, an example overall flow for a Natural Language Query into a CMDB with inferential logic applied.

Referring now to FIG. 2, process 200 shows a high level flow chart of example processing to be performed according to the disclosed embodiments. At block 210 a natural language query is received from a user desiring information about their enterprise environment from a CMDB. The input query is first converted to a CMDB query at block 220. Next, at block 230, the CMDB query is "executed" on one or more processors. Results from the query can then have inferencing rules applied, typically by an inferencing engine (described in more detail below), at block 240. Finally, at block 250 the results obtained from the query with inferencing rules applied can be formatted into a natural language result for presentation to a user or for use by another process.

Figure 3:
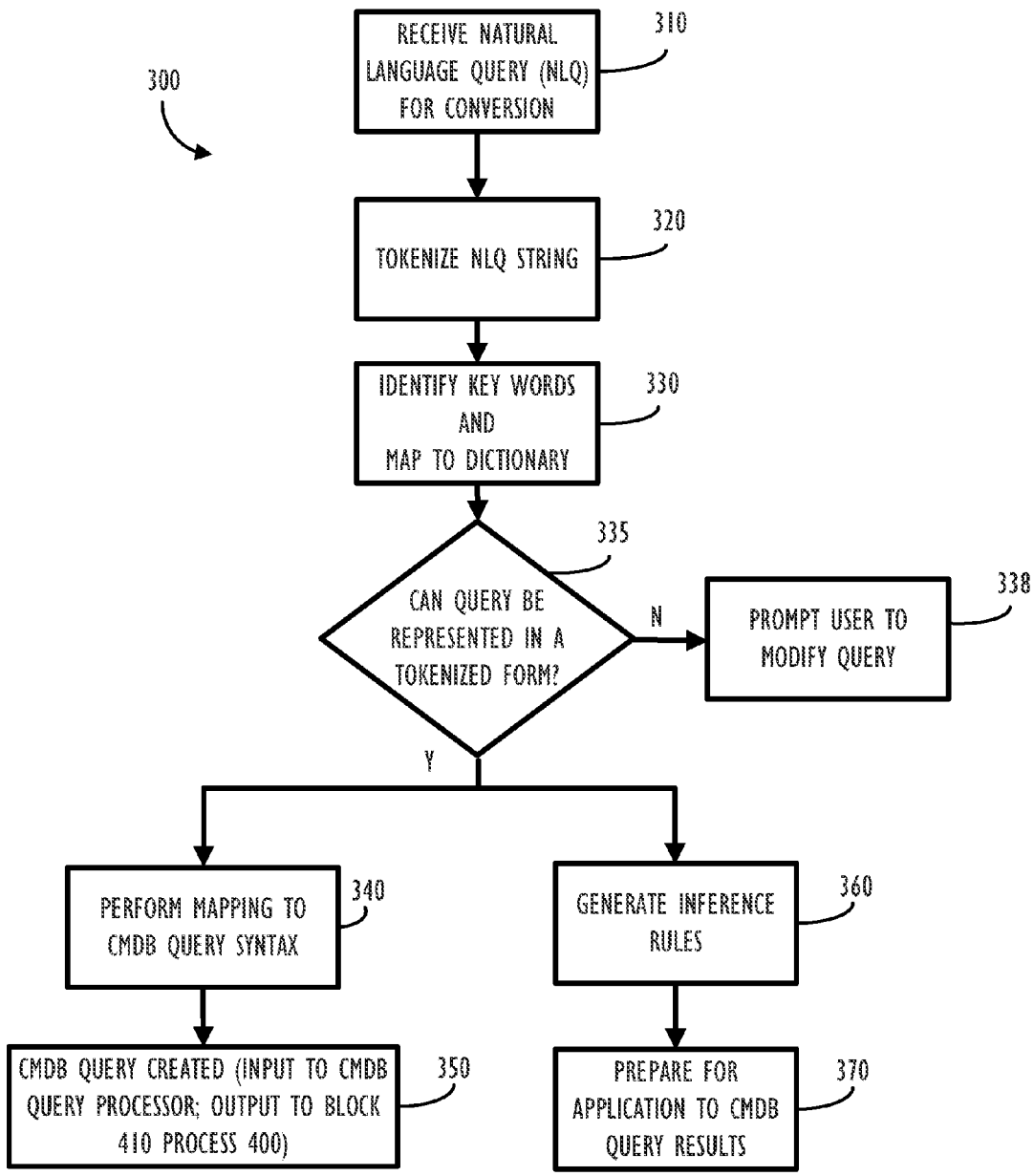
FIG. 3 shows, in flowchart form, a more detailed example of Natural Language Query processing to create a CMDB query.
Figure 4:
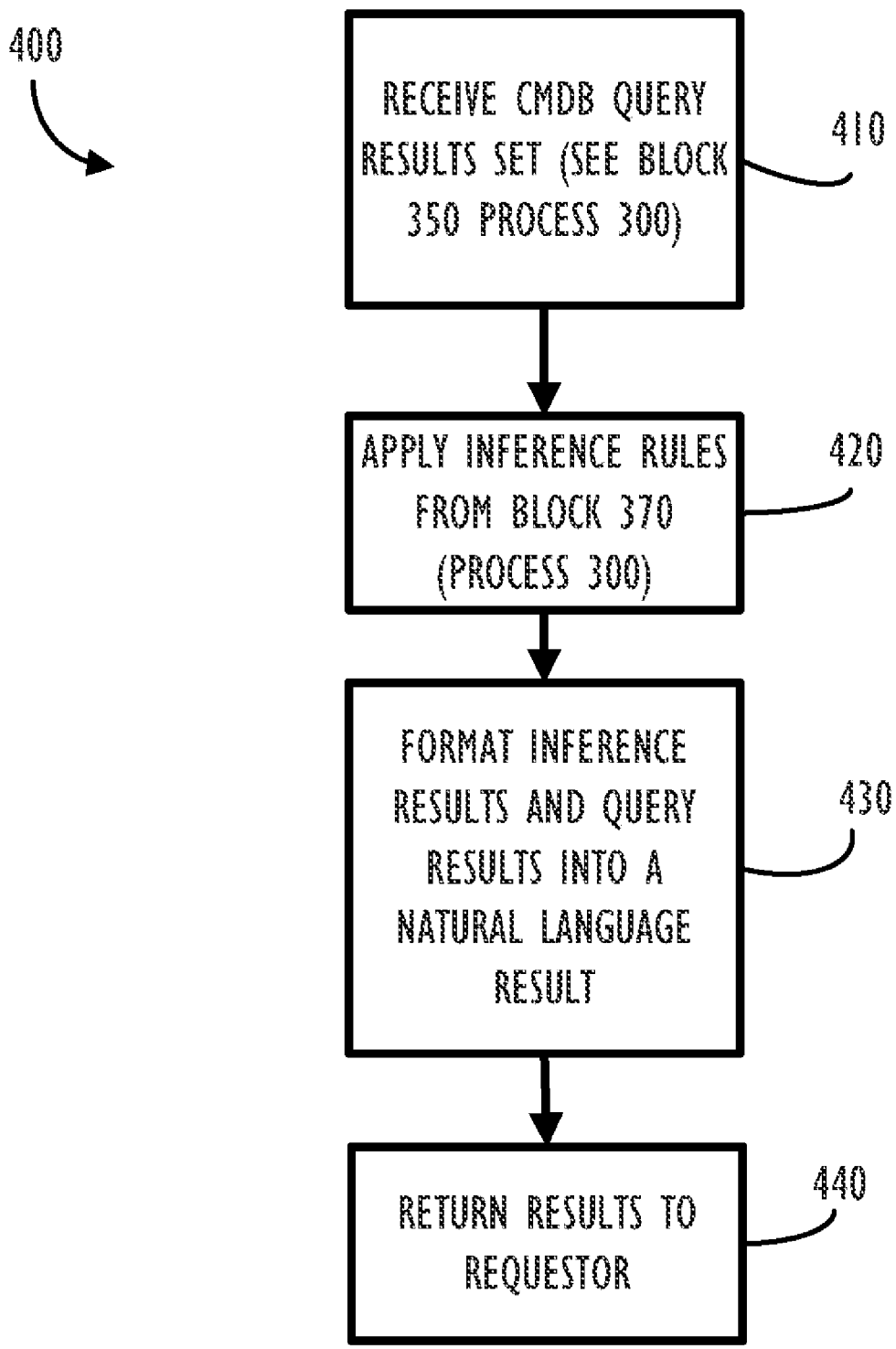
FIG. 4 shows, in flowchart form, a more detailed example of the relationship graph inferential logic applied to a CMDB query.

Referring now to FIGS. 3 and 4, processes 300 and 400 show a more detailed flowchart according to the disclosed embodiments. At block 310 a natural language query is received and prepared for conversion. The conversion can include parsing the input query and tokenizing the natural language query string as shown at block 320. The key words of the input string are recognized and mapped to a supporting dictionary at block 330. At decision point 335 it is determined if enough information has been recognized to represent the query in a tokenized form. If not (the NO prong of block 335) control can be returned to the user (block 338) requesting a modification or explanation of unrecognized portions of the natural language query. If enough information is believed to be available (the YES prong of block 335) flow continues to blocks 340 and 360 in parallel. At block 340 the tokenized string is mapped to a CMDB query syntax and at block 350 a CMDB query can be created for use in process 400. At block 360 inference rules can be generated in parallel with creating the CMDB query. At block 370 the generated inference rules can be further processed for application to the CMDB query results.

Process 400 of FIG. 4 shows the combination of the parallel processes spawned during process 300. At block 410 the CMDB query results set (as a result of block 350) are received. Next at block 420 the prepared inference rules are applied to the results set. At block 430 the results of the inferential analysis being applied to the query results can be formatted into a natural language query result. Finally, at block 440 these formatted results can be returned to the requestor. Each of these processes will be explained further below with reference to FIGS. 8A-D and example query workflows.

Figure 5:
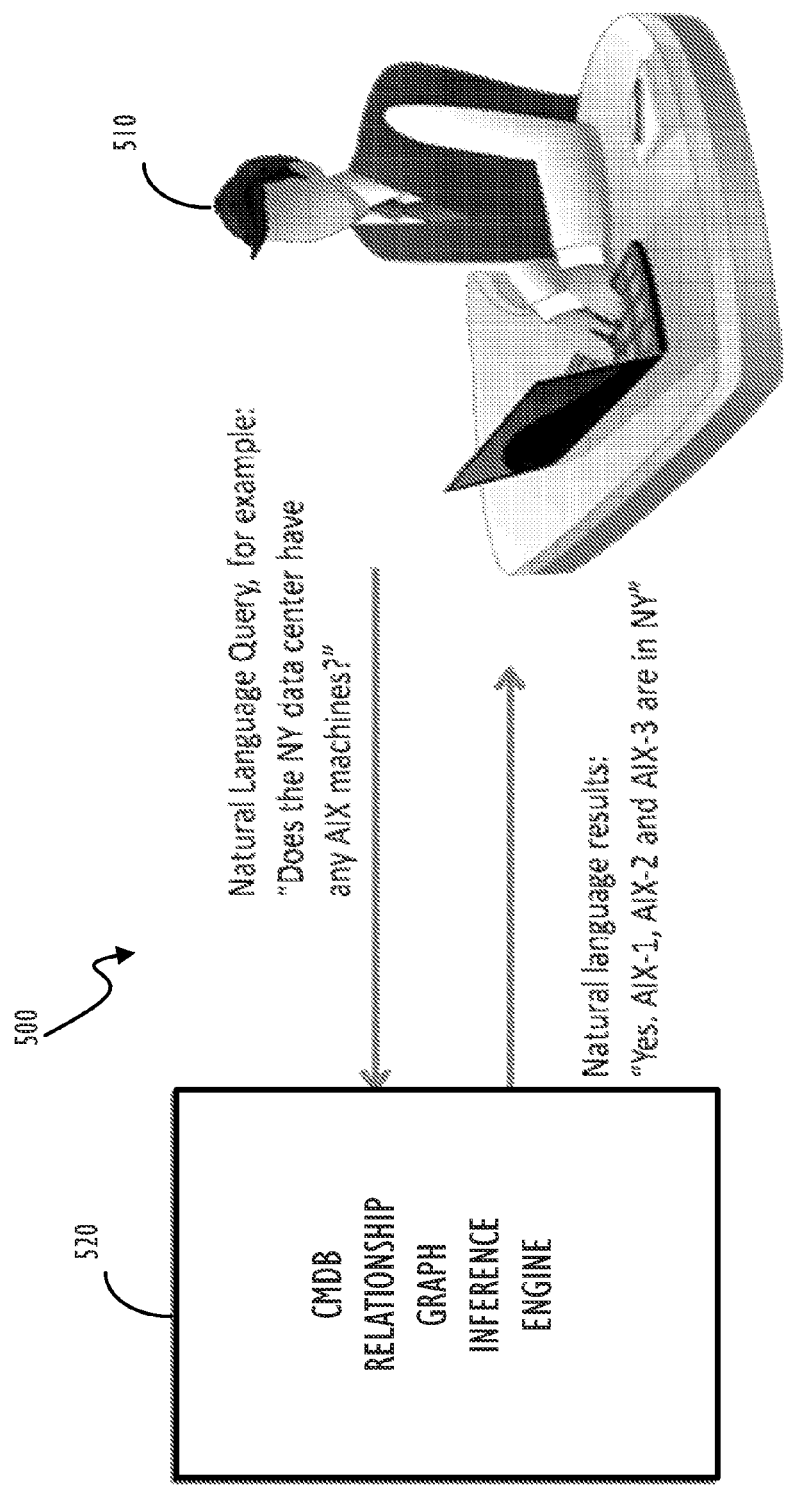
FIG. 5 shows, in block diagram form, a relationship of an example natural language query between an end user and a CMDB according to one disclosed embodiment.

Referring now to FIG. 5, block diagram 500 shows a user preparing an example input natural language query from a client requesting process executing on a desktop, laptop or similar end user device 510. The input query is sent to a CMDB relationship graph inference engine across a network or other communications coupling of the end user device. Results are similarly returned to the end user device.

Figure 6:
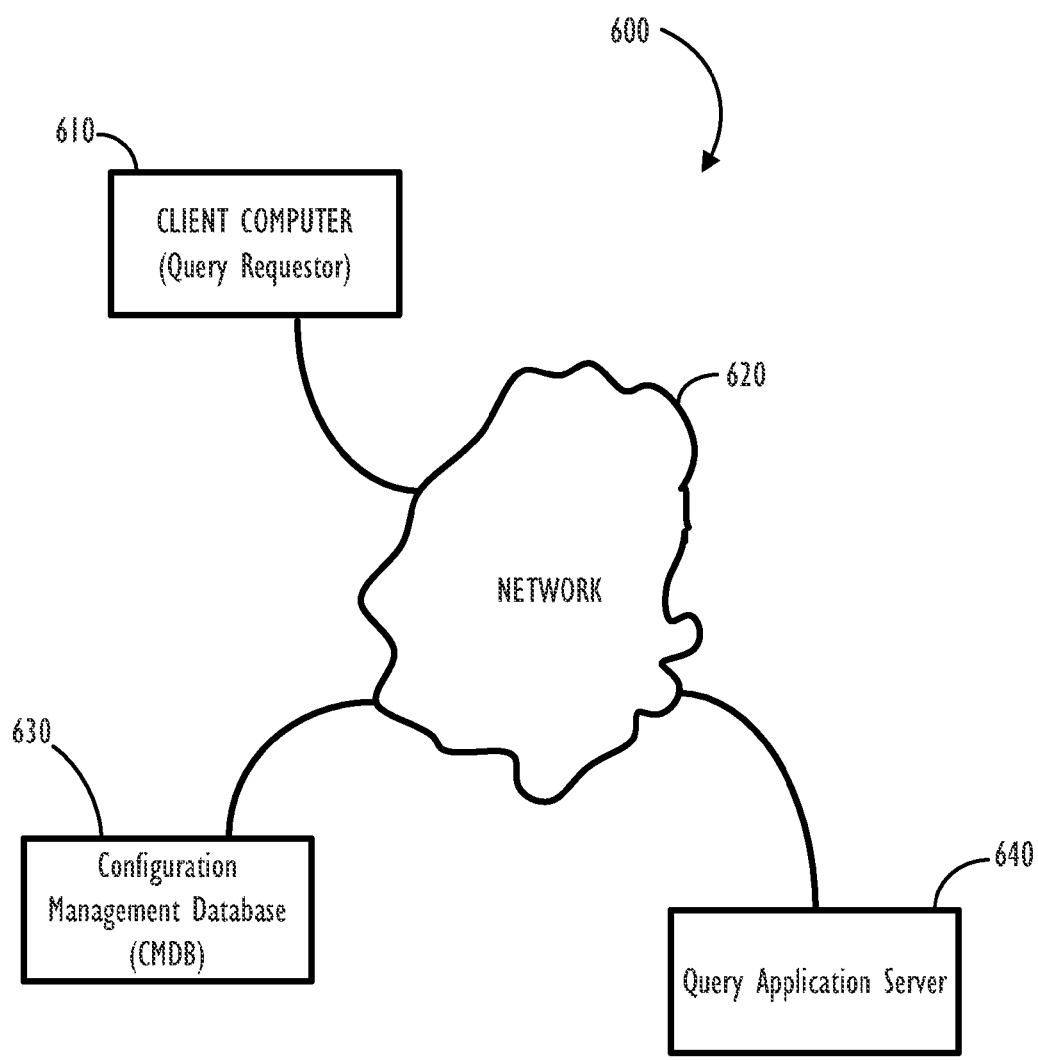
FIG. 6 shows, in block diagram form, a simplified computer network comprising a CMDB server, a client requestor computer and a query application server.

Referring now to FIG. 6, block diagram 600 shows an example network 620 and connected machines 610, 630 and 640 according to a disclosed embodiment. Network 620 can be either wired or wireless and support different types of network protocols as required (e.g., TCP/IP, UDP, etc.). Client computer 610 represents a device used by an end user to submit query requests into system 600. CMDB server 630 contains one or more data bases to support information about an enterprise computer and end user environment. CMDB server 630 can be a single server with a single data source or can be multiple servers comprising a federated (i.e., multiple data sources) CMDB. Query application server 640 can be one or more servers configured to support interfaces to applications requiring support from or access to CMDB 630 and other enterprise applications.

Figure 7:
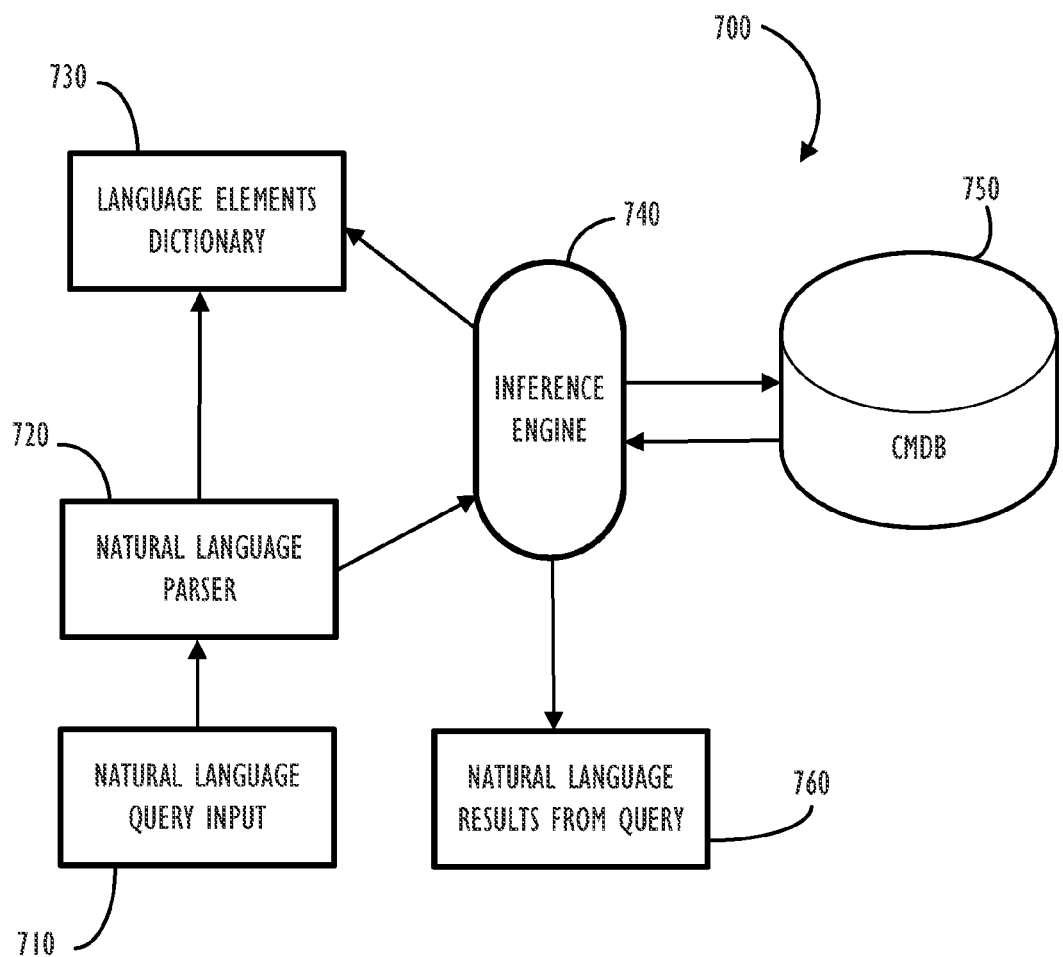
FIG. 7 shows, in block diagram form, an example of interfaces to an inferencing engine according to a preferred embodiment.

Referring now to FIG. 7, block diagram 700 shows an exemplary CMDB relationship graph inference engine architecture according to one disclosed embodiment. The components shown comprise a CMDB 750, an Inference Engine 740, a Natural Language Parser 720 and a Language Elements Dictionary 730. Input to the engine 740 is derived from a natural language input query 710 and results are returned in a natural language format as shown at block 760. The CMDB can be a standard "off the shelf" CMDB. Recall, the CMDB is where the CIs and their relationships can be stored. The Inference Engine 740 can perform the translation of natural language queries into (potentially) a set of graph queries that can be executed iteratively until the desired results are obtained. The Inference Engine 740 can further translate these results into a natural language. The Natural Language Parser 720 can use the Language Elements Dictionary 730 to translate the input natural language query into a query that can be understood by the CMDB 750. The Language Elements Dictionary 730 can be used for both translations to and translations from natural language (i.e., input and output).

Referring now to FIGS. 8A-D, by way of example four different use cases and sample workflows according to one disclosed embodiment are explained with reference to FIGS. 8A-D. Each example query will require interaction with the Language Elements Dictionary 730 and the Natural Language Parser 720 to parse the query and each query will require inferencing (i.e., traversal of relationships implied but not explicit in the input query). Each example can be logically subdivided into the following sections: Query, Description, Relationship, Dictionary Content, CMDB Content and Workflow. The Query subsection is simply a statement of the natural language query that is being examined. The Description subsection provides details on what the intent, purpose and potential results of such a query would be. The Relationship subsection identifies the type of configuration item relationship that is the basis of the query. The Dictionary Content subsection provides example content of the dictionary that is to enable parsing of the natural language query. The content is for illustrative purposes only. It is likely that the actual implementation of this feature will require content other than that provided in this simplified example. The CMDB Content subsection provides example content in the CMDB that would be used to resolve the query. This content is illustrative and does not necessarily correspond to a real instantiation of a commercial CMDB. The Workflow subsection demonstrates the steps that could be taken to go from natural language query to natural language results. These workflows are spelled out in a form of pseudo-code easily understood by those of ordinary skill in the art to show all the steps necessary to resolve the example queries (and queries like them).

Figure 8A:
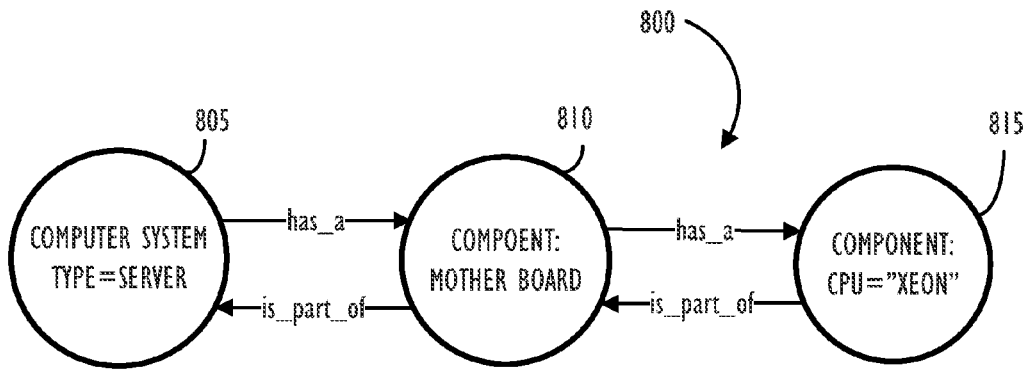
FIGS. 8A-D show, in graph form, example relationships supporting exemplary workflow queries of this disclosure.

Referring now to FIG. 8A, the example input query for this workflow example is "which servers have Xeon processors?" (Xeon is a registered trademark of the Intel Corporation). This query may be desirable for the purposes of maintenance, provisioning, inventory tracking or other reasons a system administrator may need to determine which of the servers in the enterprise have a Xeon processor. The Relationships, as shown in the diagram of CMDB Content 800, comprise "is_part_of" and "has_a" which are self explanatory and are the inverse of each other. Each of elements 805, 810 and 815 shows that a computer system of type server can have a motherboard and the motherboard may have a Xeon CPU installed on it. The workflow of this example comprises the following steps:
1) Using the dictionary parse the query into:
    a) source CI: Computer System, type='Server'
    b) relationship: has_a
    c) target CI: Computer System, CPU='Xeon'
2) Query the Computer System class for all instances of type 'Server.'
3) For each Server found in step 2 traverse the has_a relationship outward.
4) Iterate over step 3 until either:
    a) no more traversals to iterate over
    b) Computer System of type CPU is reached (i.e., 815)
5) If the CPU computer system is a Xeon processor add the source Computer System to the results set.
6) Go on to next one of all Computer Systems returned in step 2.

Figure 8B:
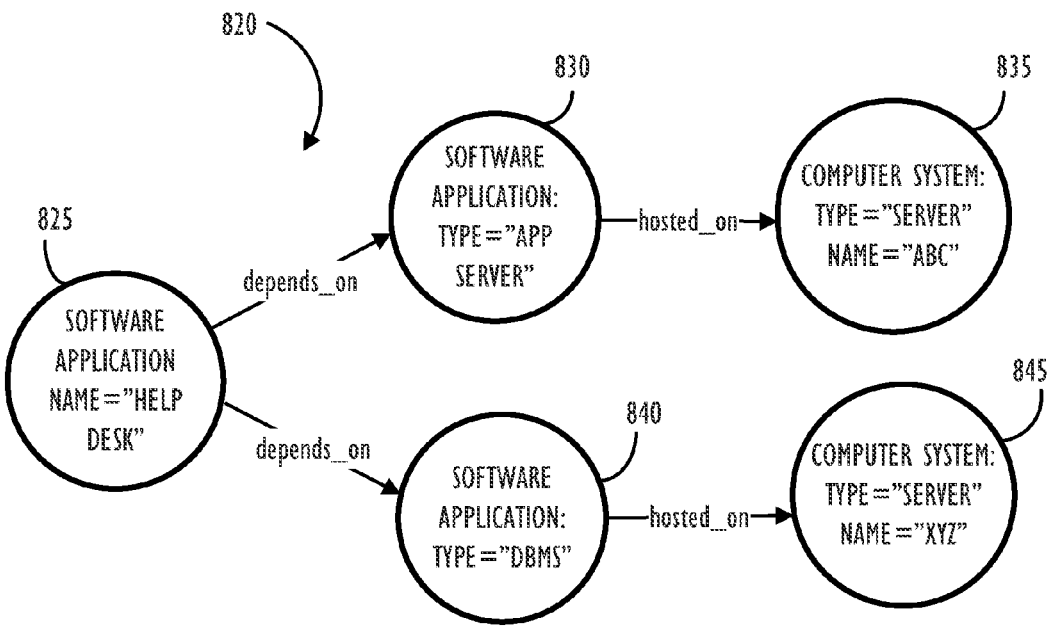

Referring now to FIG. 8B, the example input query for this workflow example is "Does the help desk application depend on server xyz?" This query may be desirable if an administrator would like to re-purpose a given server named, xyz. The administrator may not know if this server somehow participates in the mission critical help desk system. The Relationships, as shown in the diagram of CMDB Content 820, comprise "depends_on" and "hosted_on" which are self explanatory. Each of elements 825, 830, 835, 840 and 845 shows that a computer system can have an implied relationship with other servers. The workflow of this example comprises the following steps:
1) Using the dictionary parse the query into:
    a) source Configuration Item: Software Application, name='Help Desk'
    b) relationship: depends_on
    c) target Configuration Item: Computer System, type='Server'; name='xyz'
2) Locate the CI of Software Application with name='Help Desk'.
3) Traverse all outgoing depends_on relationships (there are likely to be more than one).
4) For each outgoing relationship in step 4 traverse depends_on or hosted_on relationships until either:
    a) no more traversals to iterate over
    b) Computer System of type 'Server' and name 'xyz' is reached
5) (must traverse all hosted_on relationships as if they were depends_on relationships)
6) If condition 4 b is met we are done and dependency exists.
7) If all traversals of step 4 are done and server xyz is not reached there is no dependency.

Figure 8C:
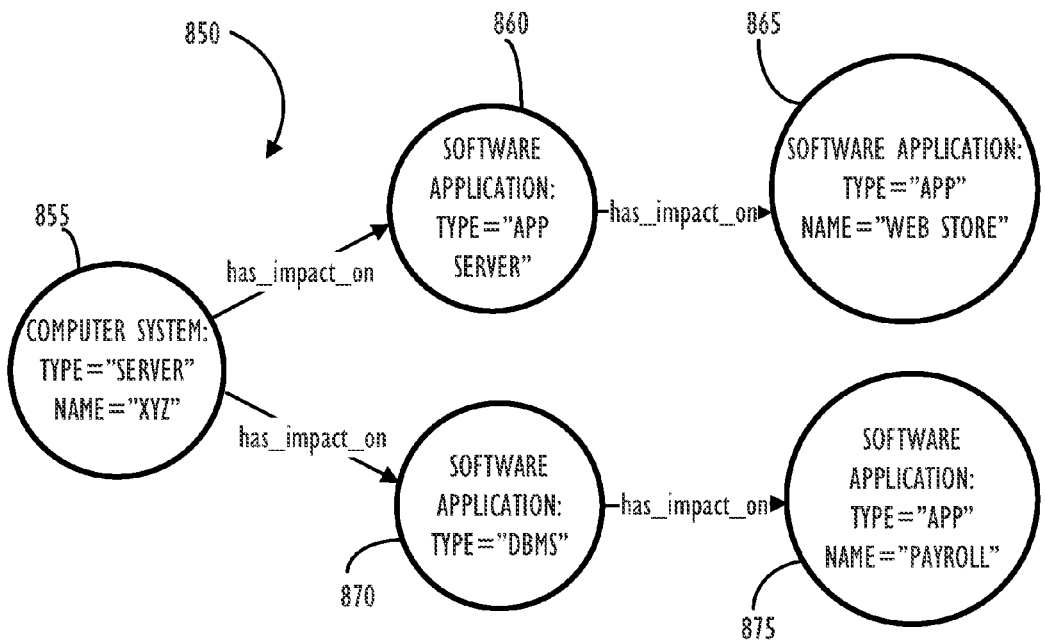

Referring now to FIG. 8C, the example input query for this workflow example is "What applications would be impacted by the crash of server xyz?" This query is kind of the inverse of the previous query. In this case we would like to find out if a given server were to crash, what applications would be impacted. Note you could start with each application and find if it has a dependency on server xyz; or you could start with server xyz and find which applications are dependent on it. The Relationship, as shown in the diagram of CMDB Content 850, comprises "has_impact_on." Each of elements 855, 860, 865, 870 and 875 shows that a computer system can have an implied relationship with other servers. The workflow of this example comprises the following steps:
1) Using the dictionary parse the query into:
    a) source Configuration Item: Computer System, type='Server'
    b) relationship: has_impact_on
    c) target Configuration Item: Software Application
2) Locate the Computer System CI with type='Server' and name='xyz'.
3) Traverse all outgoing has_impact_on relationships (there are likely to be more than one).
4) For each outgoing relationship in step 3 traverse has_impact_on relationships until either:
    a) no more traversals to iterate over
    b) CI of type Software Application is reached
5) (must traverse all hosted_on relationships as if they were depends_on relationships)
6) If condition 4 b is met we add the name of the Software Application to the result set.

Figure 8D:
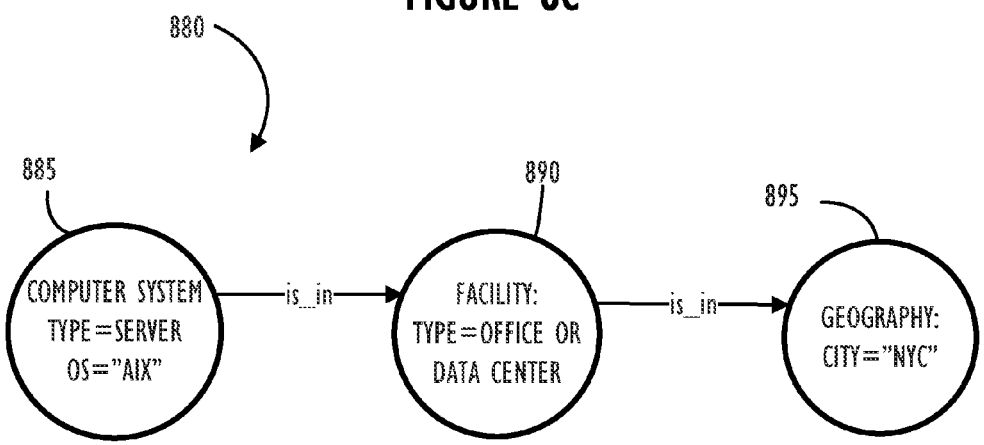

Referring now to FIG. 8D, the example input query for this workflow example is "Which machines run the AIX Operating System in New York, N.Y.?" This query is self explanatory. The Relationship, as shown in the diagram of CMDB Content 880, comprises "is_in." Each of elements 885, 890 and 895 shows that a computer system can have a relationship with a geographic location or data center location. The workflow of this example comprises the following steps:
1) Using the dictionary parse the query into:
    a) source Configuration Item: Computer System, type='Server'
    b) relationship: is_in
    c) target Configuration Item: Geography='NYC'

2) Query the Computer System class for all instances of type 'Server' and OS='AIX'.
3) For each Server found in step 2, traverse the is_in relationships outward.
4) Iterate over step 3 until either:
   a) no more traversals to iterate over
   b) Geography of NYC is reached
5) If the Geography='NYC' add the AIX machine to the results set.
6) Repeat for all Computer Systems found in step 2.

Figure 9:
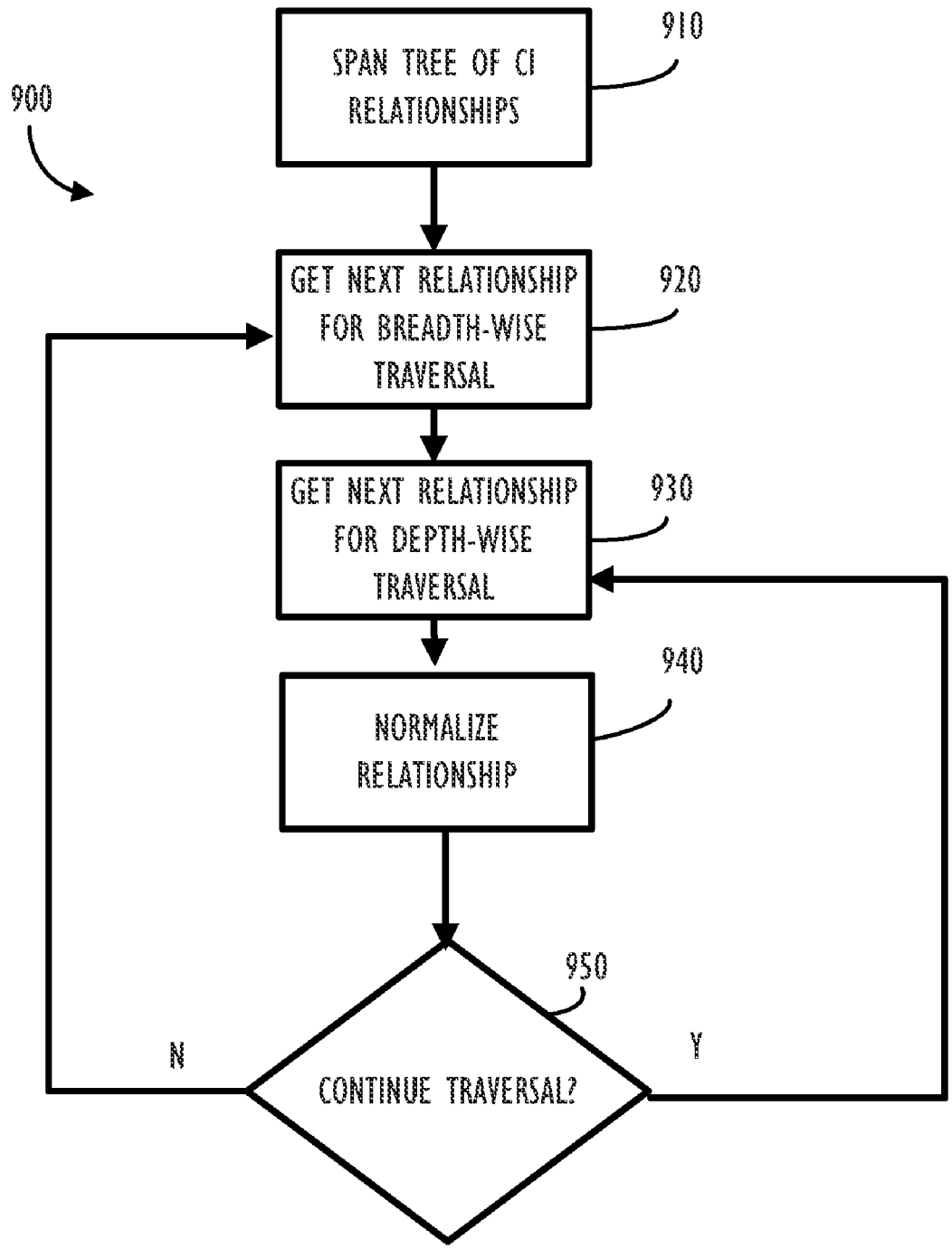
FIG. 9 shows, in flowchart form, an example of breadth-wise iteration and depth-wise iteration to perform inferential queries against a CMDB.

Referring now to FIG. 9, a flow chart of an inferencing methodology of traversal process 900 according to one disclosed embodiment is shown. Inferencing methodology includes both a breadth-wise traversal (i.e., iterate over all relationships emanating from a given CI) and a depth-wise traversal. Proper inferential checking may require using a recursive spanning tree algorithm. Note this is for the whole spanning tree and not a minimal spanning tree. In simple terms, every node emanating from a given CI must be checked and because there may be several nodes adjacent to the CI each of those must be checked. Further, there is a whole tree that spans from the next level down and a depth-wise traversal may have to be performed to check each node in each tree. Beginning at block 910, a first CI is identified and a breadth-wise traversal of each relationship for the first CI is begun. The next relationship is obtained at block 920 for each CI directly related to the first CI. At block 930, a depth-wise traversal is begun for the particular CI obtained in block 920 (a second CI). Each relationship for the second CI is normalized at block 940 (using at least in part a language elements dictionary) so that relationships that mean the same thing but are not exact matches can be considered to be a match. At block 950, it is determined if more depth-wise traversal is needed and if so (the YES prong of block 950) control is returned to block 930 where a second relationship for the second CI can be analyzed. If we are at the end of the depth-wise tree (i.e., at a leaf node) or types of relationships do not match (the NO prong of block 950) control is returned to block 920 where a next instance of a second CI can begin its analysis. A type of relationship will not match if we encounter a relationship that does not match after normalization rules have been applied. For example, if we are looking for CIs that are "components of" a given CI and as we are traversing the relationship tree we encounter a "is_located_in" relationship we can check our normalization rules and determine that "is_located_in" is not a normalized equivalent of "is_component_of." Therefore, we can stop the traversal in the direction of the "is_located_in" relationship and continue (if required) with other relationships in the tree.

Figure 10:
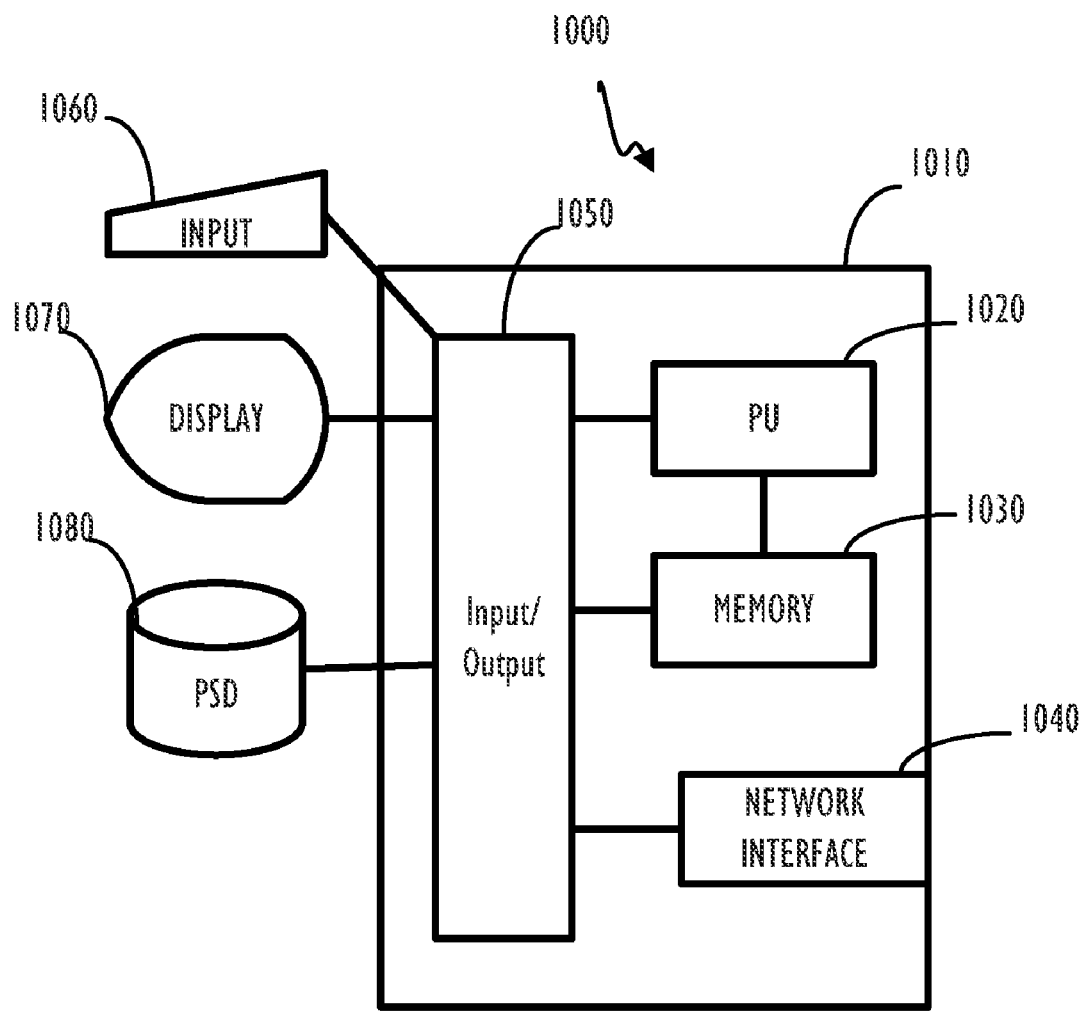
FIG. 10 shows, in block diagram form, an exemplary computing device comprising a program control device.

Referring now to FIG. 10, an exemplary computing device 1000 is shown. One or more exemplary computing devices 1000 may be included in a mainframe computer (not shown) or a standard distributed computer. Exemplary computing device 1000 comprises a programmable control device 1010 which may be optionally connected to input 1060 (e.g., keyboard, mouse, touch screen, etc.), display 1070 or program storage device (PSD) 1080 (sometimes referred to as a direct access storage device DASD). Also, included with program device 1010 is a network interface 1040 for communication via a network with other computing and corporate infrastructure devices (not shown). Note network interface 1040 may be included within programmable control device 1010 or be external to programmable control device 1010. In either case, programmable control device 1010 will be communicatively coupled to network interface 1040. Also note, program storage unit 1080 represents any form of non-volatile storage including, but not limited to, all forms of optical and magnetic storage elements including solid-state storage.

Program control device 1010 may be included in a computing device and be programmed to perform methods in accordance with this disclosure (e.g., those illustrated in FIGS. 2-4 and 9). Program control device 1010 comprises a processor unit (PU) 1020, input-output (I/O) interface 1050 and memory 1030. Processing unit 1020 may include any programmable controller device including, for example, processors of an IBM mainframe (such as a quad-core z10 mainframe microprocessor). Alternatively, in non-mainframe systems examples of processing unit 1020 include the Intel Core®, Pentium® and Celeron® processor families from Intel and the Cortex and ARM processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory 1030 may include one or more memory modules and comprise random access memory (RAM), read only memory (ROM), programmable read only memory (PROM), programmable read-write memory, and solid state memory. One of ordinary skill in the art will also recognize that PU 1020 may also include some internal memory including, for example, cache memory.

Aspects of the embodiments are described as a method of control or manipulation of data, and may be implemented in one or a combination of hardware, firmware, and software. Embodiments may also be implemented as instructions stored on a machine-readable medium, which may be read and executed by at least one processor to perform the operations described herein. A machine-readable medium may include any mechanism for tangibly embodying information in a form readable by a machine (e.g., a computer). For example, a machine-readable medium (sometimes referred to as a program storage device or a computer readable medium) may include read-only memory (ROM), random-access memory (RAM), magnetic disc storage media, optical storage media, flash-memory devices, electrical, optical, and others.

In the above detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim.

Various changes in the details of the illustrated operational methods are possible without departing from the scope of the following claims. For instance, illustrative flow chart steps or process steps of FIGS. 2-4 and 9 may be performed in an order different from that disclosed here. Alternatively, some embodiments may combine the activities described herein as being separate steps or combine the logical systems described herein as being separate computers into one physical computer. Also, flow chart steps or process steps may be performed substantially in parallel (i.e., at nearly the same time on separate processing units) and may therefore increase throughput. Similarly, one or more of the described steps may be omitted, depending upon the specific operational environment the method is being implemented in. In addition, acts in accordance with FIGS. 2-4 and 9 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices, sometimes called computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method of performing a natural language query attains a database using a computer system comprising one or more programmable processing units on one or more devices communicatively coupled to each other, the method comprising:
    receiving a natural language query from an end user at the computer system;
    parsing the natural language query to identify one or more keywords;
    generating a structured query based at least in part on the one or more keywords;
    obtaining at least a portion of a semantic network representation comprising one or more relationships associating different items of data in the database;
    generating one or more inference rules by normalizing the one or more relationships against a language elements dictionary;
    initiating the structured query thereby generating a first results set; and
    applying the one or more inference rules to the first results set to produce a second results set.

2. The method of claim 1 wherein obtaining comprises retrieving from an already populated semantic network.

3. The method of claim 1 wherein obtaining comprises generating a semantic network from information available in the database.

4. The method of claim 1 wherein the database is a Configuration Management Database (CMDB).

5. The method of claim 4 wherein the CMDB is a federated CMDB.

6. The method of claim 1 wherein applying the one or more inference rules comprises applying inference rules using a breadth-wise traversal technique.

7. The method of claim 1 wherein applying the one or more inference rules comprises applying inference rules using a depth-wise traversal technique.

8. The method of claim 7 wherein the one or more inference rules are iteratively applied until a branch of the search tree is exhausted by reaching a leaf node or reaching a relationship branch not of interest.

9. The method of claim 1 further comprising processing the second result set to translate the data of the second results set into a natural language format prior to presentation to an end user.

10. The method of claim 1 further comprising:
    determining whether the structured query can be generated from the received natural language query; and
    initiating a prompt to a user to refine the natural language query when a structured query cannot be properly generated.

11. The method of claim 1 where initiating the structured query and receiving a first results set are performed substantially in parallel with the acts of obtaining at least a portion of a semantic network and generating one or more inference rules.

12. A computer system comprising one or more programmable processing units on one or more devices communicatively coupled to each other wherein the one or more programmable processing units are programmed to:
    receive a natural language query from an end user at the computer system;
    parse the natural language query to identify one or more keywords;
    generate a structured query based at least in part on the one or more keywords;
    obtain at least a portion of a semantic network representation comprising one or more relationships associating different items of data in the database;
    generate one or more inference rules by normalizing the one or more relationships against a language elements dictionary;
    initiate the structured query thereby generating a first results set; and
    apply the one or more inference rules to the first results set to produce a second results set.

13. The computer system of claim 12 wherein the programmed act of obtaining comprises retrieving from an already populated semantic network.

14. The computer system of claim 12 wherein programmed act of obtaining comprises generating a semantic network from information available in the database.

15. The computer system of claim 12 wherein the database is a Configuration Management Database (CMDB).

16. The computer system of claim 15 wherein the CMDB is a federated CMDB.

17. The computer system of claim 12 wherein the programmed act of applying the one or more inference rules comprises applying inference rules using a breadth-wise traversal technique.

18. The computer system of claim 12 wherein the programmed act of applying the one or more inference rules comprises applying inference rules using a depth-wise traversal technique.

19. The computer system of claim 18 wherein the one or more inference rules are iteratively applied until a branch of the search tree is exhausted by reaching a leaf node or reaching a relationship branch not of interest.

20. The computer system of claim 12 further comprising a processing unit programmed to process the second result set to translate the data of the second results set into a natural language format prior to presentation to an end user.

21. The computer system of claim 12 further comprising a processing unit programmed to:
    determine whether the structured query can be generated from the received natural language query; and
    initiate a prompt to a user to refine the natural language query when a structured query cannot be properly generated.

22. The computer system of claim 12 where the programmed acts of initiating the structured query and receiving a first results set are performed substantially in parallel with the programmed acts of obtaining at least a portion of a semantic network and generating one or more inference rules.

23. A non-transitory computer readable medium having computer-executable instructions stored thereon for instructing a computer system to perform the method of claim 1.

24. A computer network comprising:
   a plurality of processing units communicatively coupled to a computer network; and
   a first processing unit configured to perform at least a portion of the method of claim 1 wherein the entire method of claim 1 is performed collectively by the plurality of processing units.

* * * * *

UNITED STATES PATENT AND TRADEMARK OFFICE
CERTIFICATE OF CORRECTION

| | |
|---|---|
| PATENT NO. | : 8,380,645 B2 |
| APPLICATION NO. | : 12/788476 |
| DATED | : February 19, 2013 |
| INVENTOR(S) | : Vincent Joseph Kowalski |

It is certified that error appears in the above-identified patent and that said Letters Patent is hereby corrected as shown below:

On the title page, item (75), in "Inventor", in column 1, line 1, after "Vincent" insert -- Joseph --.

Signed and Sealed this
Twenty-first Day of May, 2013

Teresa Stanek Rea
*Acting Director of the United States Patent and Trademark Office*